(12) United States Patent
Huber

(10) Patent No.: US 7,362,386 B2
(45) Date of Patent: Apr. 22, 2008

(54) INTEGRATED STRUCTURAL SCREEN PANEL FOR PROJECTION TELEVISION

(75) Inventor: Richard E. Huber, Lebanon, TN (US)

(73) Assignee: Toshiba America Consumer Products, L.L.C., Wayne, NJ (US)

( * ) Notice: Subject to any disclaimer, the term of this patent is extended or adjusted under 35 U.S.C. 154(b) by 968 days.

(21) Appl. No.: 10/212,240

(22) Filed: Aug. 6, 2002

(65) Prior Publication Data

US 2004/0027498 A1  Feb. 12, 2004

(51) Int. Cl.
    *H04N 5/64* (2006.01)
(52) U.S. Cl. .................. 348/789; 348/787; 348/794; 348/823
(58) Field of Classification Search ............... 348/789, 348/787, 794, 805, 744, 822, 823, 824, 836; 359/443, 452, 453, 455, 457, 460, 745; 345/32; *H04N 5/75, 5/64*
    See application file for complete search history.

(56) References Cited

U.S. PATENT DOCUMENTS

| | | | |
|---|---|---|---|
| 4,329,716 A | 5/1982 | Porco | |
| 4,381,421 A | 4/1983 | Coats et al. | |
| 4,715,137 A * | 12/1987 | Scheve | 40/546 |
| 4,907,090 A | 3/1990 | Ananian | |
| 5,119,271 A | 6/1992 | Aoki et al. | |
| 5,293,244 A | 3/1994 | Kawaguchi | |
| 5,548,350 A | 8/1996 | Yamada et al. | |
| 5,580,145 A * | 12/1996 | Yamada et al. | 353/74 |
| 5,581,407 A | 12/1996 | Mitani et al. | |
| 5,592,241 A * | 1/1997 | Kita et al. | 348/823 |
| D398,657 S | 9/1998 | Palmer et al. | |
| 5,818,545 A * | 10/1998 | Takiguchi et al. | 348/734 |
| 5,831,585 A * | 11/1998 | Aoki et al. | 345/32 |
| 5,844,715 A | 12/1998 | Park et al. | |
| 5,910,826 A | 6/1999 | Aoki et al. | |
| 5,914,809 A | 6/1999 | Mitani et al. | |
| 5,923,908 A * | 7/1999 | Schrock et al. | 396/85 |
| 6,137,548 A | 10/2000 | Uchida et al. | |
| 6,157,416 A | 12/2000 | Whitelaw et al. | |
| 6,459,531 B1 * | 10/2002 | Min | 359/450 |
| 6,661,473 B1 * | 12/2003 | Teshima et al. | 348/787 |

* cited by examiner

*Primary Examiner*—Trang U Tran
(74) *Attorney, Agent, or Firm*—Nixon & Vanderhye PC

(57) ABSTRACT

A screen assembly for a projection television includes a screen panel, a lenticular screen and a Fresnel screen. The screen panel is attached directly to the television cabinet and sandwiches the Fresnel and lenticular screens therebetween. The screen panel projects laterally beyond the lenticular and the Fresnel screens and a recess may be provided in the television cabinet to receive the Fresnel and lenticular screens, so that the screen protection panel overlaps the front face of the cabinet sidewalls. In an exemplary embodiment, decorative bolts pass through the screen panel to secure the screen panel to the cabinet.

17 Claims, 5 Drawing Sheets

INTEGRATED STRUCTURAL SCREEN PANEL FOR PROJECTION TELEVISION

BACKGROUND OF THE INVENTION

The invention relates to projection televisions and, more particularly, to an improved screen panel for a projection television.

An example of a conventional projection television screen assembly is shown in FIG. 1. The conventional screen assembly 12 is composed of two screens, a Fresnel screen 14 and a lenticular screen 16 overlayed on the front side of the Fresnel screen. Such conventional projection TV screen assemblies require a structural/decorative frame, which usually consists of an injection molded or extruded parts to support the projection TV screens. Thus, the illustrated assembly requires a large plastic bezel 18 and metal brackets 20 to hold the screens 14,16. More specifically, as illustrated in FIG. 1, Fresnel and lenticular screens 14,16 are attached to the bezel frame using brackets 20 that are attached to the back of the bezel frame 18 with screws 22. The bezel frame assembly requires difficult sub-assembly processes, is prone to problems of rigidity, and limits aesthetic options.

More recently, a third screen 17 has been added to the screen assembly. This screen is typically made of clear or slightly tinted acrylic and serves to protect the more expensive lenticular screen from damage. Aesthetically, the screen protector 17 adds a smooth surface to the viewable area, similar to the glass of a direct view CRT.

As noted above, the conventional bezel frame requires a number of parts for mounting the screens so that the mounting process is long and cumbersome, thereby raising costs for both parts and labor.

BRIEF DESCRIPTION OF THE INVENTION

The present invention provides a flat panel screen for a projection television that eliminates the bezel frame structure to achieve a flat screen configuration while reducing assembly complexities and reducing the number of parts required for mounting the screens. As such, the invention offers a unique method of creating a projection TV set. Additionally, the screen of the invention offers a unique visual style which advantageously reflects the migration of projection TV technology from analog to digital.

In an embodiment of the invention, the optical and rugged aspects of the screen protector are combined with the structural rigidity and mounting functions afforded by the bezel frame to provide a single, rigid (structural) screen panel made from clear plastic or, more preferably, glass that can be fastened directly to the front of the cabinet, capturing the lenticular and Fresnel screens between the structural screen and the projection TV cabinet.

Thus, the invention may be embodied in a projection television assembly comprising a cabinet structure, a screen assembly including: a front screen panel having a front face and a rear face, said screen panel being generally flat with said front face substantially coextensive to and parallel to said rear face; a lenticular screen having a front face and a rear face, said front face being disposed in generally parallel facing relation to said rear face of said screen panel; a Fresnel screen having a front face disposed in opposed facing relation to said rear face of said lenticular screen; a plurality of fasteners projecting rearwardly from said screen panel and secured directly to said television cabinet, thereby to dispose said lenticular lens and said Fresnel lens between said screen panel and said cabinet.

The invention may also be embodied in a method of mounting a screen assembly to a projection television cabinet comprising the steps of providing a television cabinet; providing a generally flat protective screen panel having a front face and a rear face, said front face and rear face being generally coextensive and parallel; providing a lenticular screen; providing a Fresnel screen; disposing said Fresnel screen, said lenticular screen and said screen panel in that order adjacent a front surface of the television cabinet; and securing said screen panel to said projection television cabinet with fasteners that are mounted to said panel so as to project rearwardly therefrom, so as to hold said lenticular and Fresnel screens between said screen panel and said cabinet.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
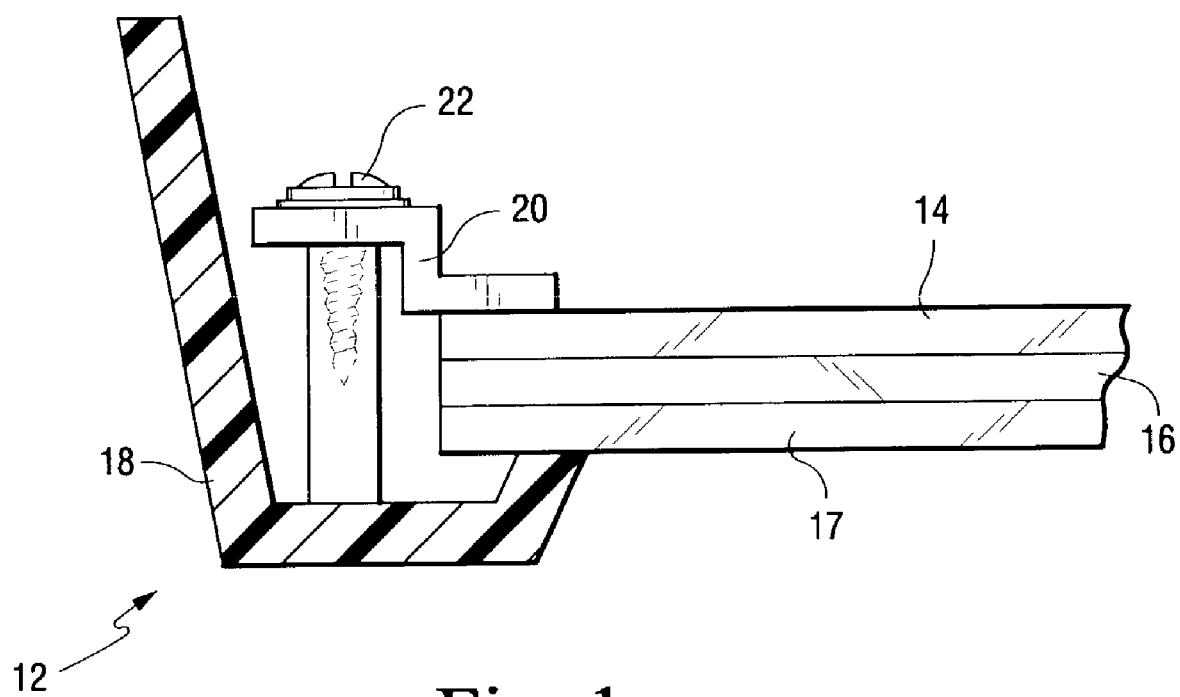
FIG. 1 is a partial schematic cross-sectional view showing a conventional bezel frame for securing screens to a conventional projection television cabinet.
Figure 2:
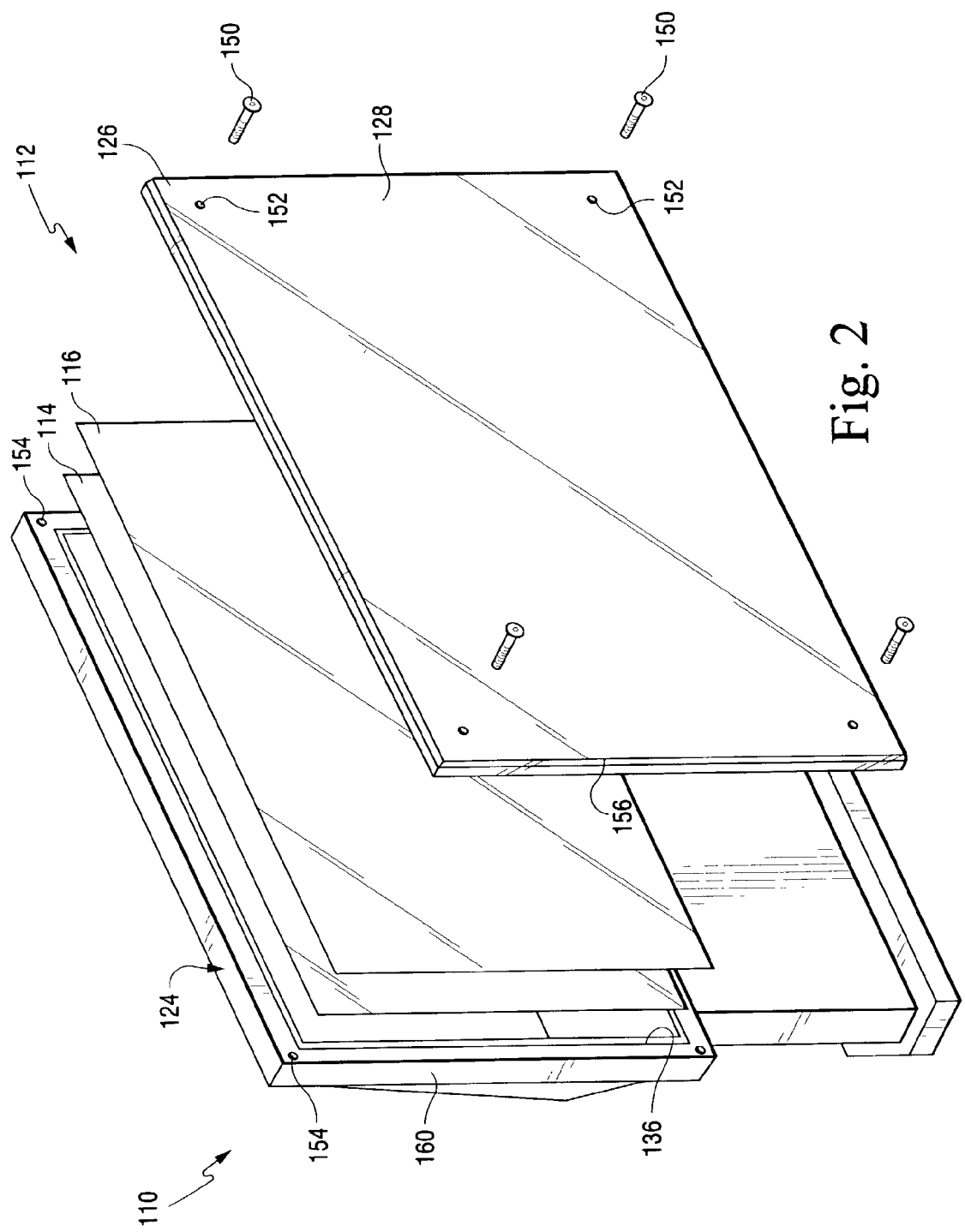
FIG. 2 is an exploded perspective view illustrating a projection panel screen assembly embodying the invention and the associated projection TV cabinet.
Figure 3:
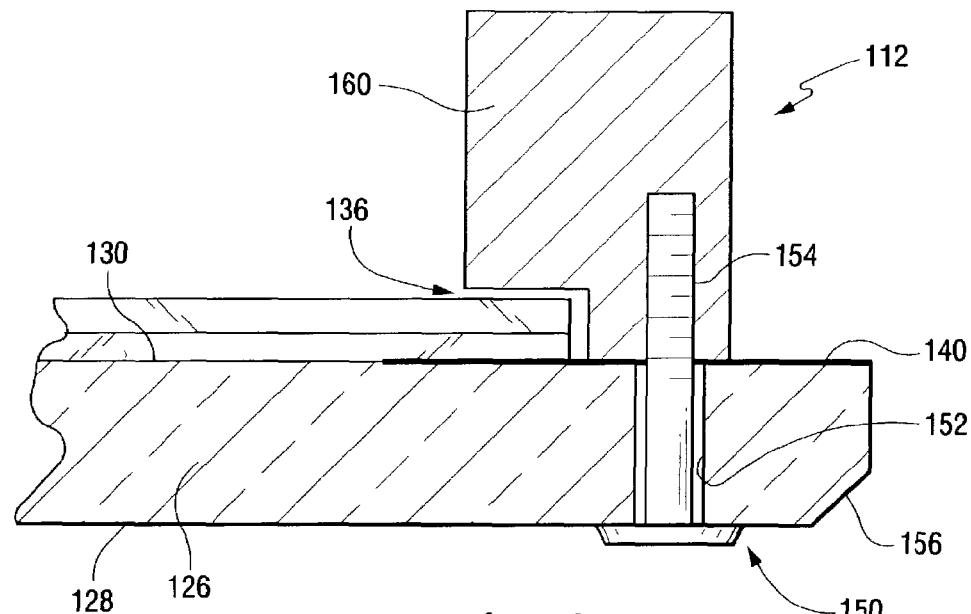
FIG. 3 is a partial schematic cross-sectional view illustrating the assembly of a screen panel to a projection television cabinet according to a first embodiment of the invention.
Figure 4:
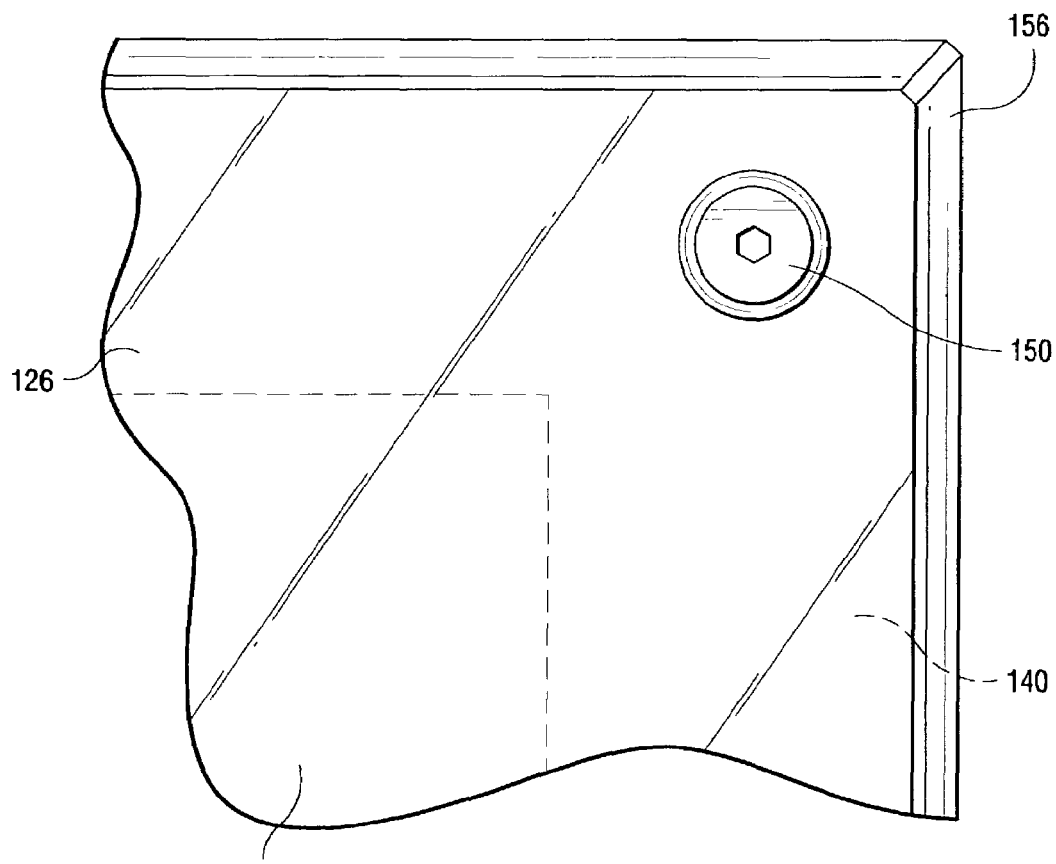
FIG. 4 is an elevational view of the structure shown in FIG. 3.

A projection television 110 having a panel screen assembly 112 embodying the invention is illustrated by way of example in FIG. 2. FIGS. 3 and 4 are enlarged cross-sectional and elevational views, respectively, of the upper right hand corner of the screen assembly 112 of FIG. 1, illustrating assembly details. In this embodiment, a conventional Fresnel screen 114 and a conventional lenticular screen 116 are provided for being mounted to a projection television cabinet 124. In accordance with the invention, a protective, structural screen panel 126 is provided to protect the more expensive lenticular screen 116 from damage and to mount both the lenticular and Fresnel screens to the television cabinet 124. The protective screen panel is made of either clear or slightly tinted plastic, such as acrylic or polycarbonate, or, more preferably, clear or slightly tinted glass as discussed more specifically below. Thus, as illustrated, the screen panel has a front face 128 and a rear face 130. The screen panel is generally flat with front face 128 substantially coextensive to and parallel to the rear face 130.

The projection television cabinet 124 itself may be made of wood, plastic, metal or the like.

In accordance with the invention, a plurality of fasteners are provided to project rearwardly from the screen panel for securing the screen panel 126 to the rear cabinet structure 124. In the embodiment of FIG. 2 the screen panel 126 is secured directly to the front face of the rear cabinet structure 124 with a plurality of fasteners 150. A plurality of apertures 152 are defined through the screen panel, for example, adjacent each of the four corners of the screen panel 126 for receiving respective fasteners. A corresponding fastener receptacle 154 is defined at the four corners of the projection television cabinet 124. In the illustrated embodiment, the edges of the screen panel are beveled as at 156 and polished to provide an aesthetically pleasing screen finish.

In an exemplary embodiment, the fasteners are decorative bolts. In such a case, the bores 154 defined in the cabinet for receiving the respective decorative bolts are threaded bores that are either integrally defined in the projection television cabinet or may be defined in a component that is an insert to the cabinet front face.

Although decorative bolts are illustrated for securing the screen panel to the television panel, it is to be understood that other fasteners, such as snap-lock fasteners, expanding fasteners and similar such detachable fastener structures may be provided for detachably securing the screen panel to the television cabinet. Furthermore, decorative caps (not shown) may be secured to the exposed fastener heads to provide a more finished look.

As will be appreciated, the provision of a relatively thick, flat glass or plastic screen panel 126 as shown combines the function of both the conventional screen protector 17 and the structural frame (bezel) assembly 12. Mounting the screen panel directly to the television cabinet with bolts allows the conventional screen brackets 20 to be eliminated. As the screen panel is a fabricated item, prohibitive tooling costs can be eliminated, making the development of lower volume models practical. Indeed, the ability to fabricate parts for the invention rather than invest in tooling is a significant advantage of the invention. In this regard, to the extent the prior art contemplated glass as a structural member in a product of the type described, it was a molded panel incorporating characteristics of the Fresnel and/or lenticular lenses. Such an approach would involve a large investment and high cost. In contrast, the invention enables the use of commonly available tempered float glass, which can be produced for no investment and at a low cost.

In an exemplary embodiment of the invention, as illustrated in FIG. 3, a recess 136 is defined about the inner periphery of the cabinet side wall 160 for receiving the Fresnel and lenticular screens 114,116. Thus, when the screen panel 126 is secured to the cabinet structure 124, the Fresnel and lenticular screens 114,116 are disposed, in this embodiment sandwiched, between the screen panel 126 and the sidewall cabinet 124 so as to be securely mounted thereto. Providing a recess 136 in the cabinet face also simplifies the manufacturing process and cost of the front panel, which is maintained as a flat glass or plastic panel.

As is apparent from the foregoing, the assembly of the invention provides the look of a flat panel product by omitting the conventional bezel frame 18. The screen panel 126 can thus extend beyond the picture area giving a thin, flat panel image that cannot be achieved with current assembly methods. Furthermore, in an exemplary embodiment, a portion of the rear face of the screen panel is black silk screened as at 140 thereby to frame the viewable area 180 as illustrated in FIG. 4. It is noted that the provision of black silk screen for framing the viewable area creates an aesthetically pleasing floating screen characteristic.

Figure 5:
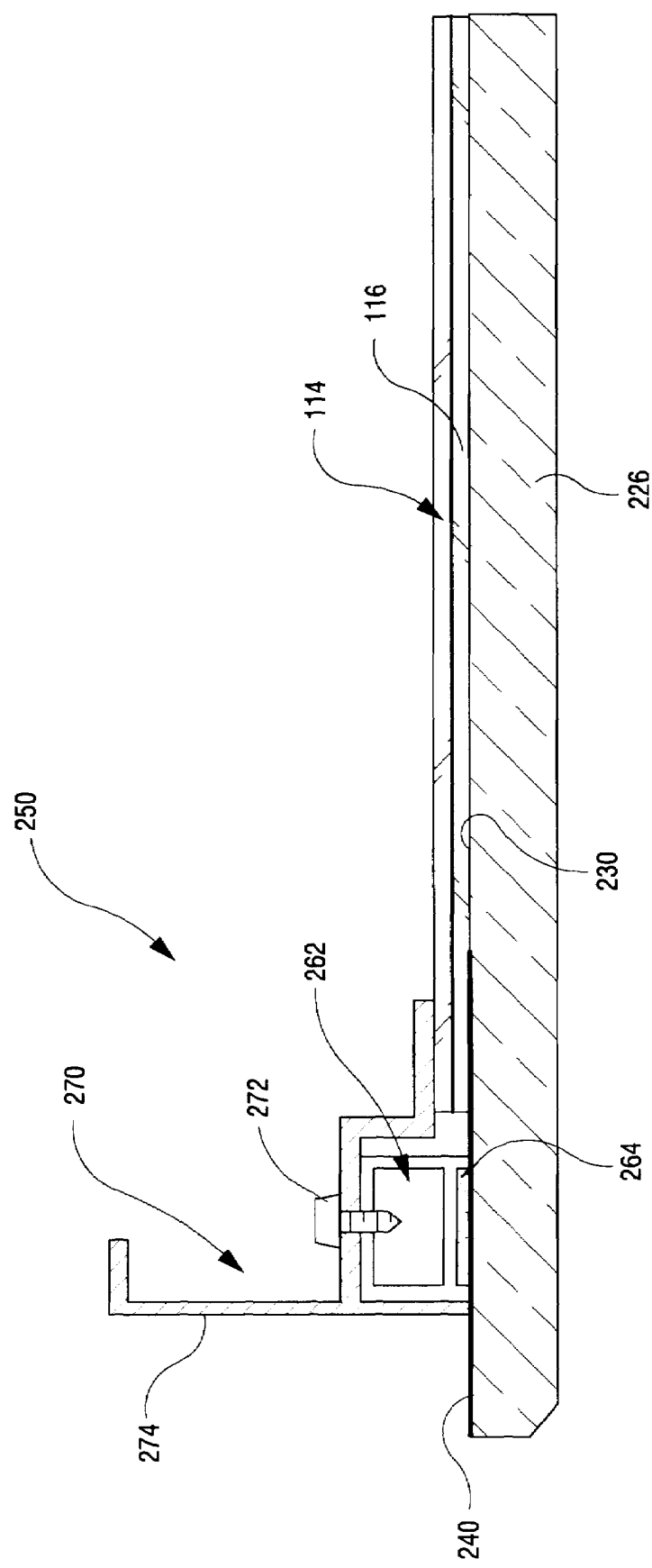
FIG. 5 is a partial schematic cross-sectional view illustrating the assembly of a screen panel to a projection television cabinet according to a second embodiment of the invention.

According to another, alternate embodiment of the invention, the fasteners 250 may be secured to the back face of the screen panel rather than disposed through apertures. An example of such an alternative is illustrated in FIG. 5. In this embodiment, a plurality of mounting blocks 262 are secured to the back side 230 of the panel 226 with suitable high strength adhesive 268. Each mounting block may be about 1 inch long and several, e.g., three or four, may be secured adjacent each peripheral side edge of the panel 226. Brackets 270 are then secured to the mounting blocks with screws 272. In an exemplary embodiment, one bracket is provided per side. As illustrated, the bracket 270 is advantageously shaped to clamp the screens 114, 116 to the panel 226 when the bracket is secured to the mounting blocks 262 and to present a securing lip 274 that is fastened in turn to the television cabinet (not shown in FIG. 5). The screen panel is advantageously silk screened as at 240 before the mounting blocks are secured thereto to provide a border to hide the adhesive, mounting blocks and brackets.

An advantage of the embodiment of FIG. 5 is that holes are not required in the glass (or plastic) panel, so that the screen presents a fully floating appearance. Also, the screen and panels can be assembled to the brackets as a subassembly, which may facilitate assembly operations.

Although the screen panel may be formed either from plastic, such as acrylic or polycarbonate, or glass, it is noted that glass is preferred. In that regard, whereas conventional screens are, e.g., acrylic, as noted above, the screen of the invention may be fabricated from glass as it is a panel having flat, coextensive front and rear faces. The protective characteristics of glass, clarity of image, resistance to scratching and resistance to damage from cleaning solutions all make glass a highly desirable screen material to the consumer. Moreover, the ability of glass to convey an image or perception of quality by emulating the look and feel of a direct view (CRT) model is a desirable product characteristic. The ability to place the lenticular and Fresnel screens directly against the back of the glass panel is an additional advantage of the proposed construction. Indeed, alternative construction methods leave an air gap between the screen protector and the screens which is susceptible to producing a "ghost" image on the back side of the protective panel/screen caused by internal reflections of the image. Thus, the ability to provide a glass screen panel, while omitting the bezel, is a significant improvement from a production cost and marketability viewpoint.

Figure 6:
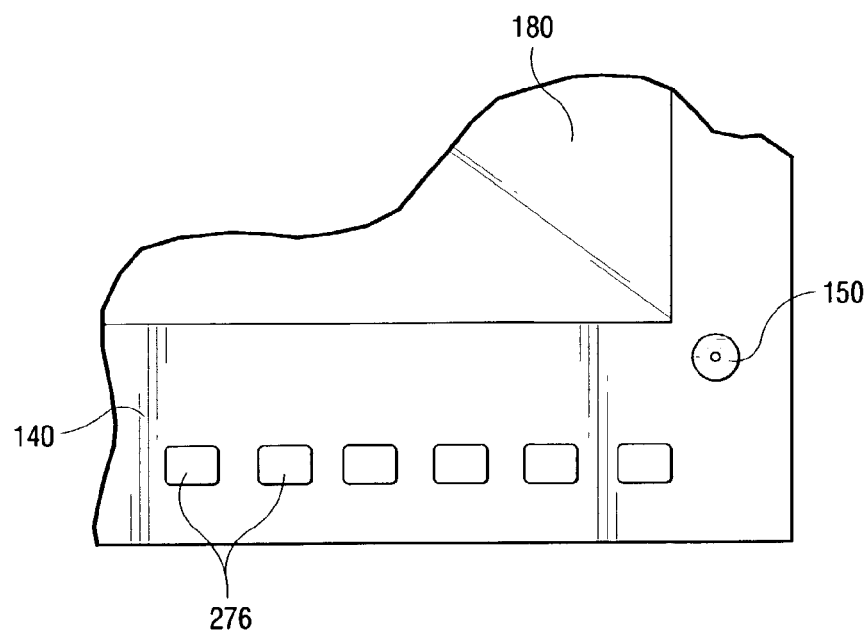
FIG. 6 is partial elevational view of an integrated touch control according to the invention.
Figure 7:
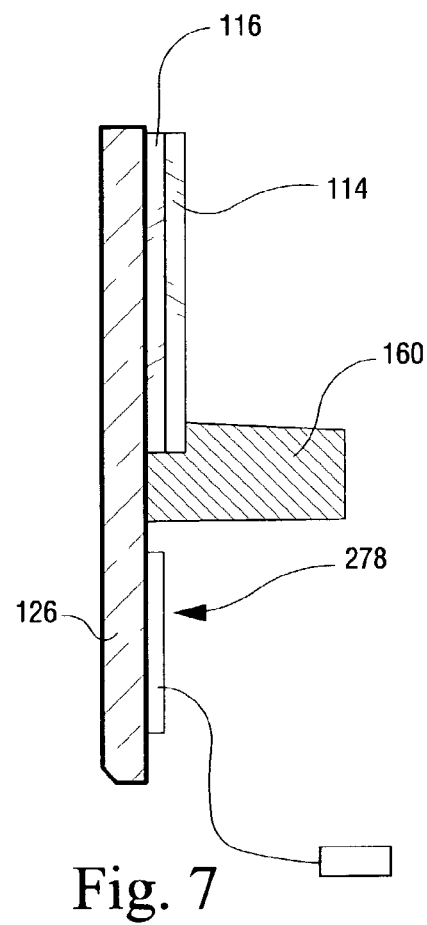
FIG. 7 is a partial schematic cross-sectional view illustrating the assembly of FIG. 6.

Referring now to FIGS. 6 and 7, according to a further feature of the invention, touch controls may be integrated onto the surface of the television screen panel. In the illustrated embodiment, the touch controls have been integrated directly onto the glass panel 126 in the area covered by the silk screened border 140, directly below the viewable area 180. To accommodate such touch controls, text and/or artwork indicating the location and function of the controls are silk screened on the back surface of the glass, as schematically shown at 276, prior to screening the border 140. The control Printed Circuit Board (PCB) incorporating suitable touch sensors 278 is attached to the back of the glass panel with adhesive after the border 140 has been silk screened.

The incorporation of touch controls provides viewing and controlling on one contiguous surface, thereby providing a high tech look, and eliminates the need for parts associated with a separate control panel. As will be appreciated, the touch sensors of the invention could be applied to any TV product such as rear projector, flat CRT direct view, etc. Indeed, the touch controls would be particularly well adapted to newer flat panel products such as Plasma or LCD televisions.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed is:

1. In a projection television assembly comprising a cabinet structure, a screen assembly including:
   a front screen panel having a front face and a rear face, said screen panel being generally flat with said front face substantially coextensive to and parallel to said rear face;
   a lenticular screen having a front face and a rear face, said front face being disposed in generally parallel facing relation to said rear face of said screen panel;
   a Fresnel screen having a front face disposed in opposed facing relation to said rear face of said lenticular screen;
   a plurality of fasteners projecting rearwardly, directly from said screen panel, and secured directly to said cabinet structure, thereby to dispose said lenticular lens and said Fresnel lens between said screen panel and said cabinets,
   wherein said plurality of fasteners comprise a plurality brackets secured to said rear face of said panel, said brackets securing said panel to said cabinet structure.

2. The projection television assembly of claim 1, wherein said screen panel is a glass panel.

3. The projection television assembly of claim 1, wherein an outer peripheral edge of said front face of said screen panel is beveled.

4. The projection television assembly of claim 1, further comprising an opaque silk screen layer applied to a perimeter of said rear face of said screen panel so as to frame a viewable area of said screen assembly.

5. The projection television assembly of claim 1, wherein said cabinet includes a peripheral recess for receiving said Fresnel and lenticular lenses when said screen panel is secured to said cabinet.

6. The projection television assembly of claim 1, wherein said brackets are indirectly secured to said panel.

7. The projection television assembly of claim 6, wherein said brackets are secured to mounting blocks that are adhesively secured to said rear face of said panel.

8. The projection television assembly of claim 1, wherein said brackets engage said Fresnel screen to clamp said Fresnel screen and said lenticular screen to said rear face of said panel.

9. The projection television assembly of claim 1, wherein said panel has a length and width greater than a length and width of said Fresnel screen and said lenticular screen so that said panel projects laterally beyond said screens, and wherein said fasteners project rearwardly from the portion of the panel disposed laterally beyond the screens.

10. The projection television assembly of claim 1, further comprising at least one touch screen sensor secured to said rear face of said screen panel.

11. The projection television assembly of claim 10, wherein said panel has a length and width greater than a length and width of said Fresnel screen and said lenticular screen so that said panel projects laterally beyond said screens, and wherein said touch screen sensors are disposed in the portion of the panel disposed laterally beyond the screens.

12. A method of mounting a screen assembly to a projection television cabinet comprising the steps of:
   providing a television cabinet;
   providing a generally flat protective screen panel having a front face and a rear face, said front face and rear face being generally coextensive and parallel;
   providing a lenticular screen;
   providing a Fresnel screen;
   disposing said Fresnel screen, said lenticular screen and said screen panel in that order adjacent a front surface of the television cabinet; and
   securing said screen panel to said projection television cabinet with fasteners that are mounted to said panel so as to project rearwardly, directly therefrom, so as to hold said lenticular and Fresnel screens between said screen panel and said cabinet,
   wherein said fasteners comprise a plurality of brackets and wherein said step of securing comprises securing said brackets to said television cabinet.

13. A method of mounting a screen assembly as in claim 12, wherein said step of disposing comprises disposing said Fresnel and lenticular lenses in a peripheral recess defined in the television cabinet and wherein said screen panel extends beyond outer peripheral edges of said lenticular and Fresnel screens.

14. A method of mounting a screen assembly as in claim 12, further comprising securing said brackets to mounting blocks that are adhesively secured to said rear face of said panel before said step of securing said brackets to said television cabinet.

15. A method of mounting a screen assembly as in claim 14, wherein said step of securing said brackets to said mounting blocks also clamps said Fresnel screen and said lenticular screen to said rear face of said panel.

16. A method of mounting a screen assembly as in claim 12, wherein said panel has a length and width greater than a length and width of said Fresnel screen and said lenticular screen so that said panel projects laterally beyond said screens, and wherein said fasteners are mounted to the portion of the panel disposed laterally beyond the screens.

17. A method of mounting a screen assembly as in claim 12, further comprising securing at least one touch screen sensor to said rear face of said screen panel.

* * * * *